(12) United States Patent  (10) Patent No.: US 9,298,381 B2
Chauvet et al.  (45) Date of Patent: Mar. 29, 2016

(54) DATA INTEGRITY MONITORING AMONG SYSPLEXES WITH A SHARED DIRECT ACCESS STORAGE DEVICE (DASD)

(71) Applicant: International Business Machines Corporation, Armonk, NY (US)

(72) Inventors: Philip R. Chauvet, Tucson, AZ (US); David C. Reed, Tucson, AZ (US); Thomas C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 14/292,675

(22) Filed: May 30, 2014

(65) Prior Publication Data

US 2015/0347045 A1 Dec. 3, 2015

(51) Int. Cl.
*G06F 17/30* (2006.01)
*G06F 3/06* (2006.01)

(52) U.S. Cl.
CPC ............ *G06F 3/0619* (2013.01); *G06F 3/0665* (2013.01); *G06F 3/0689* (2013.01); *G06F 17/30224* (2013.01); *G06F 2003/0692* (2013.01)

(58) Field of Classification Search
None
See application file for complete search history.

(56) References Cited

U.S. PATENT DOCUMENTS

| 5,390,328 | A | | 2/1995 | Frey et al. |
| 5,416,921 | A | * | 5/1995 | Frey .................... G06F 11/2035 714/11 |
| 5,463,754 | A | | 10/1995 | Beausoleil et al. |
| 5,544,345 | A | * | 8/1996 | Carpenter ............. G06F 12/084 711/141 |
| 5,758,339 | A | | 5/1998 | Barton et al. |
| 6,339,793 | B1 | * | 1/2002 | Bostian ............. G06F 17/30067 707/999.009 |
| 8,291,186 | B2 | | 10/2012 | Chauvet et al. |
| 2002/0023070 | A1 | * | 2/2002 | Branch ............. G06F 17/30008 |
| 2002/0116506 | A1 | * | 8/2002 | Lautner ................. G06F 9/5011 709/229 |
| 2010/0049937 | A1 | * | 2/2010 | Chauvet ................ G06F 3/0611 711/170 |
| 2011/0145243 | A1 | * | 6/2011 | Yudenfriend ........... G06F 9/526 707/737 |
| 2011/0282846 | A1 | | 11/2011 | Shepard et al. |
| 2013/0111026 | A1 | | 5/2013 | Chambliss et al. |
| 2014/0188888 | A1 | * | 7/2014 | Harris ..................... G06F 17/30 707/740 |

\* cited by examiner

*Primary Examiner* — Kaushikkumar Patel
(74) *Attorney, Agent, or Firm* — Eric A. Gifford

(57) ABSTRACT

System and method embodiments for monitoring data integrity among multiple sysplexes that share data sets on a DASD are provided. The virtual volume record (VVR) for each data set on DASD is configured with additional access fields that provide such information as the access mode (serial or multi-access), whether multiple systems have opened the data set, the names of an original sysplex and any additional sysplexes to open the data set, the names of the opening systems in each sysplex, job name and time stamp and a usage counter for each sysplex. Additional access logic in the OS on each system defines specific actions to be taken by the system OS when executing an "open" or "close" including reading and updating information in the additional access fields and generating error, warning or information messages to diagnostic logs. This allows serialization to be enforced among the sysplexes and for error messages to be issued for any system outside the original sysplex that tries to open the data set. This also enables allowing multiple sysplexes to have a data set open at the same time and to issue messages to that effect.

20 Claims, 9 Drawing Sheets

| VVCR | SELF-DESCRIBING VVR | VVR/NVR | VVR/NVR | VVR/NVR |
|---|---|---|---|---|

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS |
|---|---|---|---|---|---|---|---|---|---|
| 0001 | X | Y | PLEX1 | SYS1 | PAY 1 | 1 | 1 | 08:12:05 | NA |
| 0002 | X | Y | PLEX1 | SYS3 | PAY 2 | 2 | 3 | 08:13:22 | 1 |
| 0002 | X | Y | PLEX1 | SYS5 | PAY 2 | 2 | 3 | 08:15:33 | 1 |
| 0002 | X | Y | PLEX2 | SYS3 | DIAG 1 | 1 | 3 | 08:15:33 | 1 |

FIG.2

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS |
|---|---|---|---|---|---|---|---|---|---|
| 0001 | X | Y | 0 | 0 | 0 | 0 | 0 | 0 | 0 |
| 0001 | X | Y | PLEX1 | SYS3 | PAY1 | 2 | 1 | 08:25:01 | N/A |
|  |  | ↑ 140 | PLEX1 | SYS5 | PAY1 | 2 | 1 | 08:27:32 | N/A |
|  |  |  |  |  |  |  |  |  |  |
|  |  |  |  |  |  |  |  |  |  |

FIG.4a

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS |
|---|---|---|---|---|---|---|---|---|---|
| 0001 | X | Y | 0 | 0 | 0 | 0 | 0 | 0 | 0 |
| 0001 | X | Y | PLEX1 | SYS3 | PAY1 | 2 | 3 | 08:25:01 | 1 |
| | | | PLEX1 | SYS5 | PAY1 | 2 | 3 | 08:27:32 | 1 |
| | | | PLEX2 | SYS2 | PAY3 | 1 | 3 | 08:28:00 | 1 |
| | | | | | | | | | |

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS COUNTER |
|---|---|---|---|---|---|---|---|---|---|
| 0001 | X | Y | 0 | 0 | 0 | 0 | 0 | 0 | 0 |
| 0001 | X | Y | PLEX1 | SYS3 | PAY 1 | 1 | 3 | 08:25:22 | 1 |
|  |  |  | PLEX2 | SYS5 | PAY 2 | 1 | 3 | 08:27:04 | 1 |

FIG.6a

SYSPLEX 2, SYS5 CLOSE

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS COUNTER |
|---|---|---|---|---|---|---|---|---|---|
| 0001 | X | Y | 0 | 0 | 0 | 0 | 0 | 0 | 0 |
| 0001 | X | Y | PLEX1 | SYS3 | PAY 1 | 1 | 3 | 08:25:22 | 1 |
|  |  |  | PLEX2 | SYS5 | PAY 2 | 0 | 3 | 08:27:04 | 1 |

FIG.6b

SYSPLEX 1, SYS3 CLOSE

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS COUNTER |
|---|---|---|---|---|---|---|---|---|---|
| 0001 | X | Y | 0 | 0 | 0 | 0 | 0 | 0 | 0 |
| 0001 | X | Y | PLEX2 | SYS5 | PAY 2 | 1 | 3 | 08:25:22 | 0 |

FIG.6c

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS |
|---|---|---|---|---|---|---|---|---|---|
| 0001 | X | Y | 0 | 0 | 0 | 0 | 0 | 0 | 0 |
| 0001 | X | Y | PLEX1 | SYS3 | PAY1 | 1 | 3 | 08:25:22 | 2 |
| | | | PLEX2 | SYS1 | PAY2 | 1 | 3 | 08:27:04 | 2 |
| | | | PLEX3 | SYS2 | PAY3 | 0 | 3 | 09:10:03 | 2 |
| | | | | | | | | | |

PLEX 1, SYS3 CLOSE

| DATA SET # | ATTRIBUTE 1 | ATTRIBUTE N | SYSPLEX | SYSTEM | JOBNAME | SYSPLEX USAGE COUNTER | MODE | TIME STAMP | MULTI-ACCESS |
|---|---|---|---|---|---|---|---|---|---|
| 0001 | X | Y | 0 | 0 | 0 | 0 | 0 | 0 | 0 |
| 0001 | X | Y | PLEX2 | SYS1 | PAY 2 | 1 | 3 | 08:27:04 | 0 |
| | | | | | | | | | |
| | | | | | | | | | |
| | | | | | | | | | |
| | | | | | | | | | |

DATA INTEGRITY MONITORING AMONG SYSPLEXES WITH A SHARED DIRECT ACCESS STORAGE DEVICE (DASD)

BACKGROUND

1. Field of the Invention

The present invention relates to data storage for computer sysplexes ("SYStem comPLEXES"), and more specifically, to monitoring serial and multiple concurrent access to data on a direct access storage device (DASD) shared among multiple sysplexes.

2. Description of the Related Art

A computer sysplex ("SYStem compPLEX") refers to a tightly-coupled cluster of independent instances of an operating system (OS) such as z/OS®. A sysplex enables the linking of multiple system images within multiple machines and treating them all as a single image. A sysplex can be a monoplex, a basic sysplex or a parallel sysplex for example. What makes a group of systems or OS images into a sysplex is the inter-image communication.

A monoplex is a single stand-alone system that is configured to use sysplex services within the system. In a monoplex, applications such as DB2, CICS, IMS etc. can communicate to each other within the system.

A basic sysplex includes multiple computer systems that communicate using channel-to-channel (CTC) connections between logical partitions (LPARs). An LPAR is in practice equivalent to a mainframe running its own OS.

A parallel sysplex includes multiple computer systems or LPARs that communicate using a Coupling Facility (CF) or cross-system coupling facility (XCF). The CF or XCF may reside on a dedicated stand-alone server configured with processors that can run Coupling Facility control code (CFCC), as integral processors on the systems themselves configured as ICFs (Internal Coupling Facilities), or less common, as normal LPARs. The CF contains Lock, List, and Cache structures to help with serialization, message passing, and buffer consistency between multiple LPARs. The primary goal of a parallel sysplex is to provide data sharing capabilities, allowing multiple databases for direct reads and writes to shared data.

A sysplex may store data on a Direct Access Storage Device or DASD, which is any secondary storage device in which each physical record has a discrete location and a unique address. DASD may include, for example, disk drives, magnetic drums or data cells. DASD may use sequential, indexed or direct access methods. The direct access capability allows records on DASD to be accessed without having to read through intervening records from the current location. Direct access is much faster than sequential access.

A plurality of logical volumes is defined on DASD. Each logical volume comprises a volume table of contents (VTOC) that is a data structure that locates data sets on the logical volume and a virtual storage access method (VSAM) volume data structure (VVDS). The VVDS includes a VSAM volume control record (VVCR), a VVDS self-describing volume record and a plurality of virtual volume records (VVRs) for different data sets. Each VVR has fields that contain information related to a particular data set on the logical volume.

DASD is designed to be used within a single sysplex. The OS on each system includes access logic to "open" and "close" a data set. The internal communications within the sysplex e.g. the CF in a parallel sysplex enforces serialization or permitted multiple access to data sets on DASD.

A unit control block (UCB) is stored in memory for each system in the sysplex. The UCB is a memory structure or "control block" that describes any single peripheral device e.g. DASD. The UCB will include a field that indicates if DASD may be shared with other systems. For a base or parallel sysplex, this field must be set to allow shared DASD.

BRIEF SUMMARY

To achieve greater storage performance, reliability and diagnostic capability for customers, a variety of improvements to storage environments continue to be made.

Direct Access Storage Device or DASD is designed to be shared only within a single sysplex. Within the sysplex, the internal communication enforces serialization or permitted multiple concurrent access to data shared on DASD. The UCB field that allows DASD to be shared must be set to support either a base or parallel sysplex. Unfortunately, this allows customers to improperly connect multiple sysplexes to share DASD. They may do this for expedience, to avoid the costs of additional storage (e.g. another DASD) or because they are simply unaware that DASD is not designed to be shared by sysplexes. Because there exists no means of communication between the sysplexes, there is no mechanism to enforce serialization or to monitor permitted multiple concurrent access among the sysplexes to data shared on DASD. This may cause problems with access to shared data on DASD and to logging of information useful for diagnosing errors should they occur.

According to one embodiment of the present invention, a system for monitoring data integrity among multiple sysplexes that share data sets on a DASD comprises additional access fields in the virtual volume record (VVR) for each data set in a VVDS for each logical volume on DASD and additional access logic in the OS on each system in each of the sysplexes. The additional access fields provide such information as the access mode (serial or multi-access), whether multiple systems have opened the data set, the names of an original sysplex and any additional sysplexes to open the data set, the names of the opening systems in each sysplex, job name and time stamp and a usage counter for each sysplex. The additional access logic defines specific actions to be taken by the system OS when executing an "open" or "close" including reading and updating information in the additional access fields and generating error, warning or information messages to diagnostic logs. This allows serialization to be enforced among the sysplexes and for error messages to be generated for any system outside the original sysplex that tries to open the data set. This also enables allowing multiple sysplexes to have a data set open at the same time. Informational or warning messages may be generated to logs for both the original sysplex and any additional sysplexes that open the data set. Different data sets may enforce serialization or allow multiple concurrent access.

In an embodiment to enforce serialization among the sysplexes, the VVRs are configured to include additional fields for at least a sysplex name, a system name and a sysplex usage counter in a stack. Assuming DASD is shared, the OS access logic for the system that first issues an open request is configured to determine that the data set is not yet open and to create an entry for that system's sysplex at the top of the stack where it is designated as the "original" sysplex, enter the system name and increment the usage counter. The OS access logic for other systems within the original sysplex may open the data set, enter the system name and increment the usage counter. The OS access logic for a system outside the original sysplex is configured to fail an additional open request for the data set as long as the original sysplex remains in the stack (i.e., the usage counter is non-zero) and to record an error message to a diagnostics log for the requesting system. The OS access logic for systems in the original sysplex is configured to close the data set, decrement the usage counter and remove the entry for the closing system from the stack. When the usage counter reaches zero, the OS access logic removes the original sysplex from the stack. Once the original sysplex is removed, another sysplex may open the data set and assume the role as the designated original sysplex.

In an embodiment to allow multiple concurrent access to the same data set among the sysplexes, the VVRs are configured to include additional fields for at least a sysplex name, a system name, a sysplex usage counter and a multi-access field that indicates whether multiple sysplexes have opened the data set. The OS access logic for a system outside the original sysplex is configured at open to create an entry for an additional sysplex in the stack, enter the system name, increment a usage counter for the additional sysplex, set the multi-access field and record a message containing information about the additional open request to a diagnostics log for the requesting system. At close, the OS access logic decrements the usage counter for open systems in the additional sysplex and sets the usage counter to zero for the closing system while retaining the entries for all systems, open or closed, in the additional sysplex in the stack. The OS access logic for a system within the original sysplex is configured at open to enter the system name and increment the usage counter. At close, the OS access logic is configured to read the entries for open requests from additional sysplexes and generate an informational or warning message to a diagnostics log for that system, remove the system entry and decrement the usage counter of the original sysplex. If the usage counter is zero, the OS access logic is configured to remove the entries for previously closed systems in the additional sysplexes, remove the entry for the original sysplex, move the next sysplex up in the stack to assume the role as the designated original sysplex and, if there are no additional sysplexes remaining reset the multi-access field.

In an embodiment, the VVRs and access logic are configured to support both serial and multi-access modes. The VVR includes an additional mode field that specifies the mode of a data set. The additional OS access logic is configured to read the mode field and execute the corresponding tasks. Different data sets may have different modes. The mode is typically set when the data set is created but may be changed.

Related method embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIG. 2 is a diagram of an embodiment of a VSAM volume data set (VVDS) structure modified for serial and multiple concurrent access by different sysplexes to data on shared DASD;

FIGS. 4a and 4b are diagrams of a stack of the additional fields in VVR in the VVDS structure for different open requests in a serial mode and a multi-access mode, respectively;

FIGS. 6a through 6c are diagrams of a stack of the additional fields in VVR in the VVDS structure for different close requests in a multi-access mode; and FIGS. 7a and 7b are diagrams of a stack of the additional fields in VVR in the VVDS structure for different close requests in a multi-access mode.

DETAILED DESCRIPTION

Figure 1:
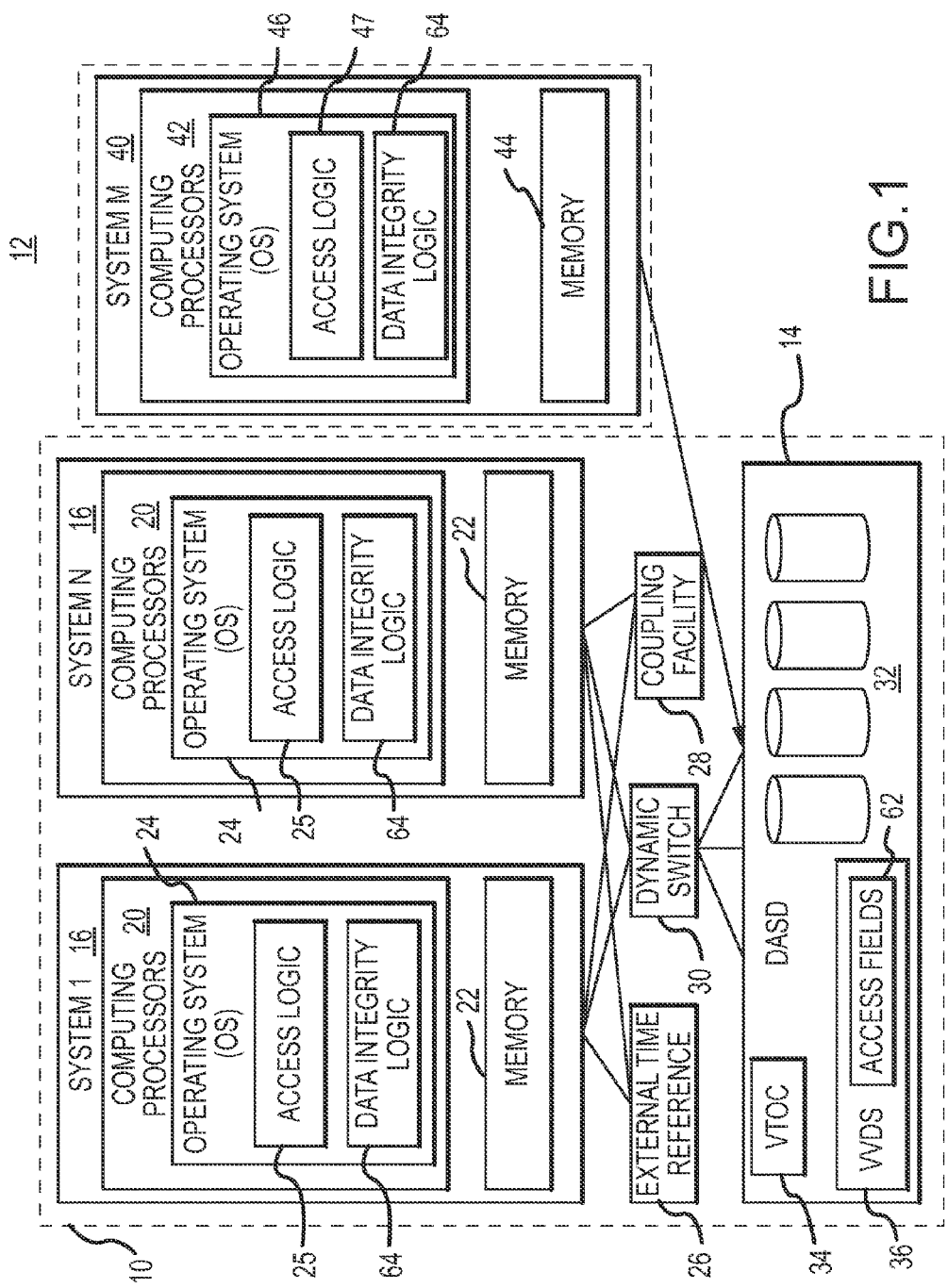
FIG. 1 is a block diagram of an embodiment of a parallel sysplex and a monoplex connected to a shared DASD in which the VVDS structure in DASD and the access logic in the OS running on each system is configured to monitor serial and multiple concurrent access to data on the shared DASD.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Although DASD is designed to be shared only within a sysplex and not between sysplexes, customers may improperly connect multiple sysplexes to share DASD. The field in the UCB for DASD that is set to allow sharing to enable a base or parallel sysplex also allows systems outside of that sysplex to be connected. They may do this for expedience, to avoid the costs of additional storage (e.g. another DASD) or because they are simply unaware that DASD is not designed to be shared by sysplexes. Because there exists no means of communication between the sysplexes, there is no mechanism to enforce serialization or to monitor permitted multiple concurrent access among the sysplexes to data shared on DASD.

This may cause problems with access to shared data on DASD and to logging of information useful for diagnosing errors should they occur. For example, two systems in two different sysplexes may open the same data set at the same time and modify the data. Or one system may open the data set to modify the data while another system in a different sysplex opens the data set to read the data. This lack of serialization may cause errors in either system. If an error does occur in a system, the system's diagnostic logs are retrieved in order to identify and attempt to correct the error. However, in these cases, a system's log will not include any information about the data set opens from other systems in a different sysplex making it very difficult to identify the cause of the error.

A solution is to use a hardware reserve that locks the entire DASD and prevents access from other sysplexes. However, this is a hardware level solution. Furthermore, it does not address the customer's needs to share DASD among sysplexes.

To achieve greater storage performance, reliability and diagnostic capability for customers, different embodiments provide for enforcement of serialization and multiple concurrent access among multiple sysplexes with shared DASD. To enforce serialization, an embodiment must allow a system to initially open a data set, allow other systems within that original sysplex to open the data set, deny open requests from systems outside the original sysplex and log an error message for the failed open, and, once the original sysplex has fully closed the data set, allow another system to open the data set and take control of the data set. To allow multiple concurrent access, an embodiment must allow systems from different sysplexes to open the same data set concurrently and log informational or warning messages for any additional open requests to logs in both the requesting system and the original sysplex. These embodiments are implemented in an environment in which there is no means for communication between the sysplexes to enforce serialization or multiple access and the DASD is passive.

The illustrated embodiments below describe a storage environment for sharing data among multiple sysplexes, for example. The illustrated embodiments provide for serialization of shared data and for multiple concurrent access to the shared data. The VVDS is modified to include additional access fields in the virtual volume record (VVR) for each data set to store information regarding access, specifically "opens", on shared DASD where it is available to all of the sysplexes. The additional access fields may provide such information as the access mode (serial or multi-access), whether multiple systems have opened the data set, the names of an original sysplex and any additional sysplexes to open the data set, the names of the opening systems in each sysplex and a usage counter for each sysplex. The OS access logic on each system in each of the sysplexes is provided with additional logic that defines action to be taken by the system OS when executing an "open" or "close" including reading and updating information in the additional access fields and issuing error, warning or information messages to diagnostic logs for the system executing the open or close.

With reference now to FIG. 1, a parallel sysplex 10 and a monoplex 12 are connected to shared DASD 14. In this example, monoplex 12 is connected to the shared DASD 14 that is part of parallel sysplex 10. Various configurations of multiple sysplexes connected to shared DASD 14 are possible including but not limited to multiple monoplexes connected to share the DASD of a single parallel sysplex, multiple monoplexes connected to a shared DASD, multiple parallel sysplexes and/or base sysplexes connected to shared DASD or combinations thereof. In configurations that include at least one base or parallel sysplex the field in the UCB (stored in memory with each system) that indicates whether DASD can be shared will have been set to enable sharing of the multiple systems within the base or parallel sysplex. In configurations that include only monoplexes, the field in the UCB will need to be set to allow sharing of DASD.

Parallel sysplex 10 comprises multiple host systems 16, e.g., System 1, to System N that access data sets on DASD 14 that is shared among the systems. Each system includes one or more computing processors 20 and memory 22. An instance of an operating system (OS) 24 such as z/OS® runs on each system of the sysplex. Each instance of OS 24 includes access logic 25 to process "open" and "close" requests for data sets on shared DASD. A UCB stored in memory 22 describes DASD 14 for each system 16. The field in the UCB that allows DASD to be shared among multiple systems must be set to allow sharing.

The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then running on another system at another point in time. To help facilitate the activity, the systems 16 are each coupled to an external time reference component 26 and a coupling facility 28. Connections to DASD 14 are facilitated through a dynamic switch 30.

DASD 14 is any secondary storage device in which each physical record has a discrete location and a unique address. DASD may include, for example, disk drives, magnetic drums or data cells 32. DASD may use sequential, indexed or direct access methods. The direct access capability allows records on DASD to be accessed without having to read through intervening records from the current location. Direct access is much faster than sequential access.

A plurality of logical volumes is defined on DASD. Each logical volume comprises a volume table of contents (VTOC) 34 that is a data structure that locates data sets on the logical volume and a virtual storage access method (VSAM) volume data set (VVDS) 36. The VVDS includes a VSAM volume control record (VVCR), a VVDS self-describing volume record and a plurality of virtual volume records (VVRs) for different data sets. Each VVR has fields that contain information related to a particular data set on the logical volume.

CF 28 may reside on a dedicated stand-alone server configured with processors that can run Coupling Facility control code (CFCC), as integral processors on the systems themselves configured as ICFs (Internal Coupling Facilities), or less common, as normal LPARs. The CF contains Lock, List, and Cache structures to help with serialization, message passing, and buffer consistency between the multiple systems 16 that share DASD 14.

Monoplex 12 comprises a single host system 40, e.g., System M. The host system includes one or more computing processors 42 and memory 44. An instance of an operating system (OS) 46 such as z/OS® runs on the system. OS 46 includes access logic 47 to process "open" and "close" requests for data sets. The host system is connected to DASD 14. The host system may be connected directly as shown, through its own dynamic switch or through the dynamic switch of parallel sysplex 10. A UCB stored in memory 44 describes DASD 14. The field in the UCB that allows DASD to be shared is set to allow sharing.

In an embodiment of the invention, access fields 62 are added to each VVR in VVDS 36 to store information that allows for tracking of which systems are accessing data sets and when they are accessed and data integrity logic 64 is added to the access logic in each instance of the OS. This logic defines actions to be taken by the system OS when executing an "open" or "close" including reading and updating information in the additional access fields and issuing error, warning or information messages to diagnostic logs for the system executing the open or close. The access fields and data integrity logic may be configured to take specific actions to enforce serialization of access to shared data sets or to allow concurrent access to a shared data set from multiple sysplexes. The data integrity logic may be configured to issue error, warning or information messages regarding access taken by a system outside of the original sysplex that opened the data set.

With reference to FIG. 2, VSAM volume data set (VVDS) 36 includes a VSAM volume control record (VVCR) 70, a VVDS self-describing volume record 72 and a plurality of virtual volume records (VVRs) 74 for different data sets. Each VVR 74 includes fields 76, generally attribute 1 to attribute N, that contain information related to a particular data set on the logical volume. Each VVR 74 also includes additional access fields 62.

Access fields 62 may include a sysplex name field 80, a mode field 82 (serial or multi-access mode) and a multi-access field 84 (indicator of whether systems from multiple sysplexes have accessed the data set) that are related to the data set, a system name field 86 and a sysplex usage counter 88 (how many systems within the sysplex are open) that are related to the sysplex, and a jobname field 90 (job associated with opening the data set) and a time stamp field 92 (time open was processed) that are related to the system.

The sysplex associated with the first system to open a data set is designated as the "original sysplex". Sysplexes associated with systems outside the "original sysplex" are designated as an "additional sysplex". Entries for the additional access fields 62 are arranged in a stack 94 for each data set. The entries for each system in the original sysplex are positioned at the top of the stack; entries for each system in an additional sysplex are positioned below the original sysplex and so forth.

To enforce serialization, the additional access fields 62 include at least the sysplex name field 80, the system name field 86 and the sysplex usage counter field 88 and suitably the jobname field 90 and time stamp field 92. In the serialization mode or "Mode 1", only a single sysplex designated the original sysplex will be created and entries for the individual system opens within the original sysplex entered into the stack. With each system open or close the usage counter is incremented or decremented. If the usage counter is zero, the entry for the original sysplex is removed from the stack.

To allow multiple concurrent access, the additional access fields 62 include at least the sysplex name field 80, the system name field 86, the sysplex usage counter field 88 and multi-access field 84. In the multi-access mode, "Mode 2" or "Mode 3", entries for the original sysplex are created as in the serial mode. When a system from an additional sysplex issues an open request for the data set, an additional sysplex is created and entries for the individual system opens within the original sysplex are entered into the stack. With each system open or close the usage counter is incremented or decremented. The entries for closed systems in an additional sysplex are retained until the original sysplex is removed. To signify a closed system, the usage counter for that system entry is set to zero.

To allow either serial access or multiple concurrent access, the additional access fields 62 include mode field 82. This field directs the OS access logic how to treat the data set. In an embodiment, multi-access includes two different modes, Mode 2 which is an informational mode and Mode 3 which is a warning mode. The only difference being the nature of the messages that are generated for additional open requests from systems outside the original sysplex.

Figure 3:
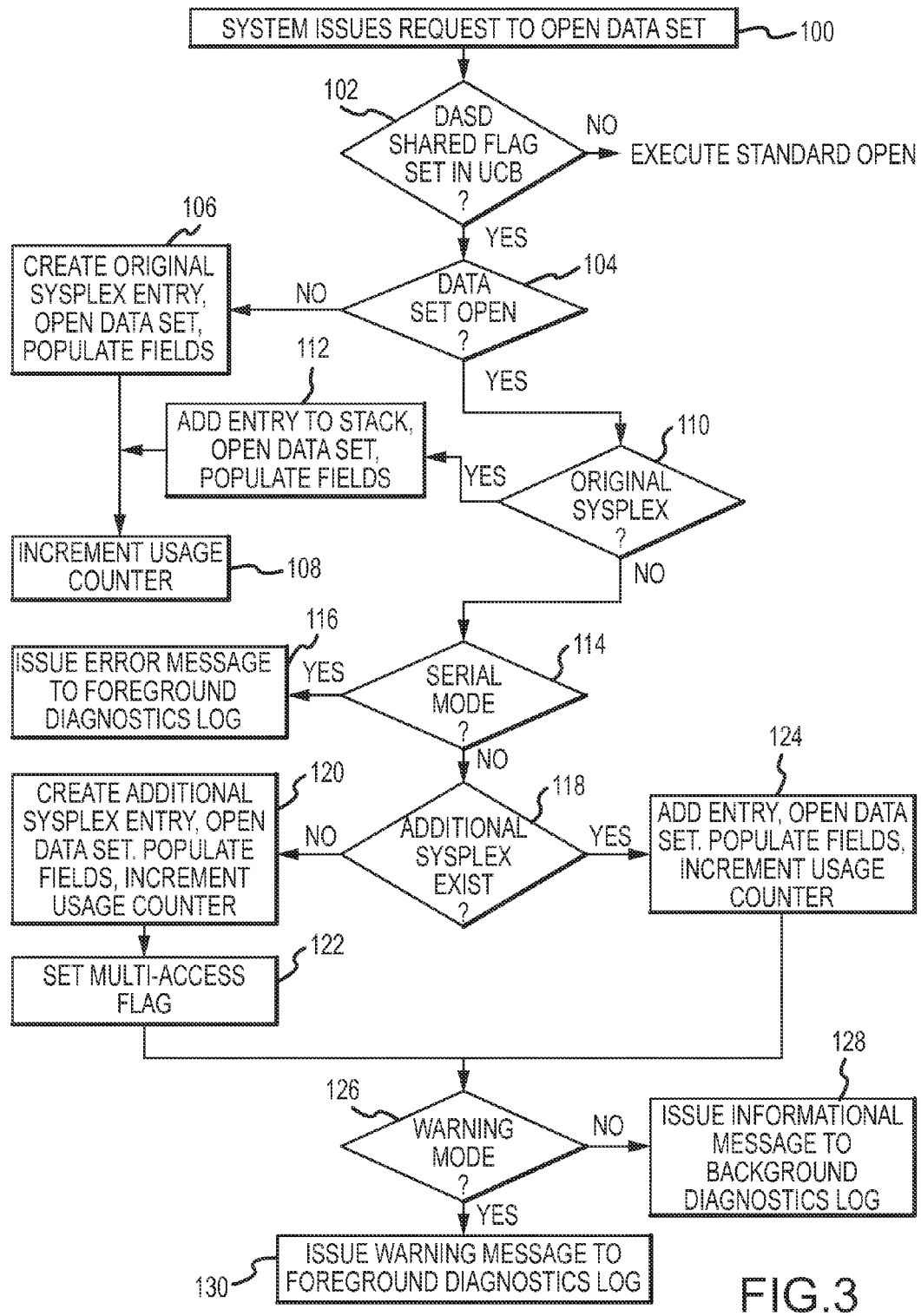
FIG. 3 is a flow diagram of an embodiment for the additional open logic in the system OS.

With reference now to FIG. 3, the OS of a requesting system issues a request to open a data set (step 100). The OS checks the field in the UCB for DASD to determine whether a flag is set indicating that DASD may be shared among multiple systems (step 102). If not, the OS executes the standard open logic for a single sysplex connected to DASD.

If DASD is shared among multiple sysplex, the requesting system OS determines whether the data set is already open (step 104). This can be done by determine whether the stack is empty or not. If not open, the requesting system OS creates an entry for an original sysplex, opens the data set and populates the sysplex name and system name fields, and jobname and timestamp fields if included (step 106) and increments the usage counter (step 108). If open, the requesting system OS determines whether it is part of the original sysplex (step 110). If yes, the requesting system OS adds an entry to the stack for the original sysplex for the requesting system, opens the data set and populates the fields (step 112) and increments the usage counter (step 108).

If the requesting system is from an additional sysplex, the requesting system OS determines whether the data set is in serial mode (step 114). If the data sets are hardcoded for serial mode the step is moot. If the data sets may be assigned either serial or multi-access modes, the requesting system OS reads the mode field to determine the mode.

If the data set is in serial mode, the requesting system OS issues an error message that is recorded in a foreground diagnostics log for the requesting system (step 116). A foreground diagnostics log is readily viewable by the user. A joblog or a syslog is an example of a foreground diagnostics log. The error message may include information to the effect that the requesting system OS tried to open data set X while it was open by another sysplex.

If the data set is not in serial mode, the requesting system OS determines whether there is an existing entry for an additional sysplex in which the requesting system resides (step 118). If not, the requesting system OS creates an entry for the additional sysplex in the stack below the original sysplex, opens the data set, populates the fields and increments the usage counter for the additional sysplex (step 120). The requesting system sets a flag or counter in the multi-access field to indicate that the data set has been opened by systems from multiple sysplexes (step 122). If yes, the requesting system OS adds an entry to the existing additional sysplex, opens the data set, populates the fields and increments the usage counter (step 124).

At open, the requesting system OS will issue a message that is recorded in a log for the requesting system. This only occurs for requesting systems with "additional sysplexes", not systems within the original sysplexes. Those messages are generate at close. If the additional data integrity logic is configured to only support a single multi-access mode, the requesting OS may be configured to issue either an informational message to a background diagnostics log or a warning message to a foreground diagnostics log. The content of the messages are suitably the same e.g., the requesting system OS opened data set X while it was open by another sysplex. The difference being that a foreground diagnostics log is readily viewable by the user whereas a background diagnostics log must be extracted. Examples of background diagnostics logs include a logrec or an SMF log.

As shown, the additional data integrity logic is configured to support two different multi-access modes. An informational mode or "Mode 2" issues an informational message to a background diagnostics log. A warning mode or "Mode 3" issues a warning message to a foreground diagnostics log. Mode 3 may be configured to issue both messages. The requesting system OS determines whether in informational mode or warning mode (step 126) and either executes step 128 to issue the information message or step 130 to issue the warning message.

The diagnostic logs generated in either the serial or multi-access modes are logs for the requesting system. The information in these logs may be accessible to other systems within the same sysplex. For example, a system may execute an "oper" command that merges the sys logs for all of the systems within a sysplex. As there exists no means for communication between sysplexes the information in these logs is not accessible to systems in other sysplexes.

With reference now to FIG. 4*a*, a VVR 140 for data set 0001 includes standard attribute fields for attributes 1 to N and additional access attribute fields. At 08:25:01 Sys3 of Plex 1 opened data set 0001 to execute job Pay1. Plex 1 is designated as the "original sysplex". Data set 0001 is serial mode 1. At 08:27:32 Sys5 of Plex 1 opened data set 0001 to also execute job Pay 1. Sys5 incremented the usage counter to two for all entries in the Plex 1. Sometime thereafter, a system from Plex 2 issued an open request. That system's OS determined that data set 0001 was already open, failed the open request and issued an error message to its foreground diagnostics log.

With reference now to FIG. 4b, a VVR 142 for data set 0001 includes standard attribute fields for attributes 1 to N and additional access attribute fields. At 08:25:01 Sys3 of Plex 1 opened data set 0001 to execute job Pay1. Plex 1 is designated as the "original sysplex". Data set 0001 is multi-access mode 3. At 08:27:32 Sys5 of Plex 1 opened data set 0001 to also execute job Pay 1. Sys5 incremented the usage counter to two for all entries in the Plex 1. Up to this time, the multi-access flag would not be set. Sometime thereafter, a Sys2 from Plex 2 executed an open request. Sys2's OS created an entry for Plex2 in the stack below the entry for Plex1, the "original sysplex", populated the fields, increment the usage counter for Plex2 to 1 and set the multi-access field for all of the systems that have data set 0001 open. At open, Sys2's OS issued a warning message to its foreground diagnostics log.

Figure 5:
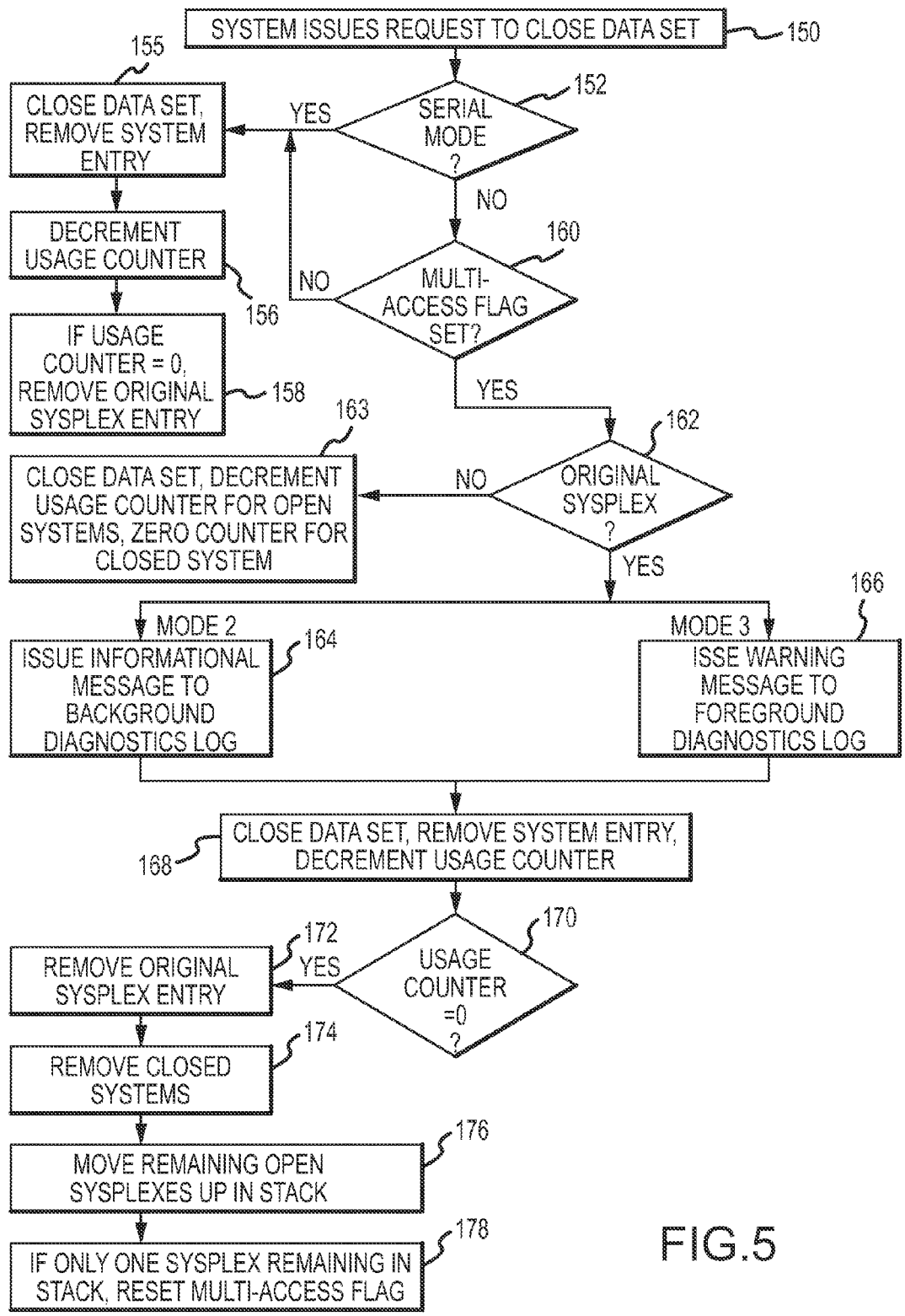
FIG. 5 is a flow diagram of an embodiment for the additional close logic in the system OS.

With reference now to FIG. 5, the OS of a requesting system issues a request to close a data set (step 150) and determines whether the data set is in serial mode (step 152). If yes, the requesting system's OS closes the data set and removes the system entry from the stack (step 154) and decrements the usage counter for the original sysplex (step 156). If the usage counter equals zero (no systems remain open), the requesting system's OS removes the original sysplex entry from the stack (step 158). Once the stack is empty, another system can open the data set and its sysplex becomes the original sysplex.

If the data set is not in serial mode, the requesting system's OS determines whether the multi-access flag is set (step 160). If not, the requesting system's OS executes steps 152 154 and 156 to close the system in the original sysplex, decrement the usage counter and possibly remove the original sysplex entry.

If the multi-access flag is set, the requesting system's OS determines whether it is part of the original sysplex (step 162). If not, the requesting system's OS closes the data set decrements the usage counter for its additional sysplex (step 163). The OS does not remove the entry from the stack. The information is retained until the original sysplex is removed. The decremented counter is saved in the usage counter field for any open systems in the additional sysplex. To indicate a system is closed, the usage counter field is set to zero.

If the multi-access flag is set and the requesting system is part of the original sysplex, as part of the close processing the requesting system's OS issues a message to a diagnostic log, suitably either an informational message to a background diagnostics log (mode 2) (step 164) or a warning message to a foreground diagnostics log (mode 3) (step 166). The requesting system's OS closes the data set, removes the system entry and decrements the usage counter for the original sysplex (step 168).

The requesting system's OS determines whether the usage counter for the original sysplex is zero (step 170). If yes, the requesting system's OS removes the original sysplex entry (step 172) and removes the entries for previously closed system in the additional sysplex(es) (step 174). The OS reads the usage counter of the systems in the additional sysplexes to determine whether they are closed. Any remaining additional sysplexes move up in the stack with the topmost sysplex being designated as the "original sysplex" (step 176). If the only sysplex remaining in the stack is the newly designated original sysplex, the requesting system's OS resets the multi-access flag (step 178).

The diagnostic logs generated in either multi-access modes are logs for the requesting system in the original sysplex. The information in these logs may be accessible to other systems within the original sysplex. For example, a system may execute an "oper" command that merges the sys logs for all of the systems within a sysplex. As there exists no means for communication between sysplexes the information in these logs is not accessible to systems in other sysplexes.

With reference to FIGS. 6a, 6b and 6c, as shown in FIG. 6a a stack 180 for a data set 0001 in multi-access mode 3 includes an entry for Sys3, Plex1 (the "original sysplex") and an entry for Sys5, Plex2 (an "additional sysplex"). As shown in FIG. 6b, Sys5 of Plex2 has executed a "close" for data set 0001. Sys5's OS has closed the data set and decremented the usage counter for Plex 2 but has not removed the entry for Sys5. If Plex2 had another open system, the usage counter would have been decremented to 1 for that open system and set to zero for Sys5 to indicate that it had been closed. In addition, sys5's OS does not generate a message at close because it would have already generate the message at open. As shown in FIG. 6c, Sys4 of Plex 1 has executed a close for data set 0001. Sys4's OS has closed the data set, decrement the usage counter for original sysplex Plex1 and removed the entry from the stack thereby moving Plex2 to the top of the stack to assume the designation of the original sysplex. Sys4's OS issues a warning message to its foreground diagnostics log. The warning message would include the open information for Sys5, Plex2 as having opened data set 0001 when the original sysplex had the data set open.

With reference to FIGS. 7a and 7b, as shown in FIG. 7a a stack 190 for a data set 0001 in multi-access mode 3 includes an entry for Sys3, Plex1 (the "original sysplex"), an entry for Sys1, Plex2 (an "additional sysplex") and Sys2, Plex3 (another "additional sysplex"). As shown Sys2, Plex3 had been previously closed but the entry retained in the stack. As shown in FIG. 7b, Sys3, Plex 1 has executed a close for data set 0001. Sys3's OS has closed the data set, removed the Sys3, Plex1 entry, decremented the usage counter, and removed the Sys2, Plex3 entry. The Sys1, Plex2 entry moves to the top of the stack making Plex2 the original sysplex. As this is the only sysplex remaining in the stack, Sys3's OS has reset the multi-access flag.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A system for monitoring data integrity, comprising:
   a direct access storage device (DASD);
   a plurality of logical volumes defined on said DASD, each logical volume comprising a virtual storage access method (VSAM) volume data structure (VVDS) that includes a VSAM volume control record (VVCR), a VVDS self-describing volume record and a plurality of virtual volume records (VVRs), each VVR having fields that contain information related to a particular data set on the logical volume; and
   a plurality of computer sysplexes that share data sets on said DASD without means to communicate between the sysplexes to serialize access to the shared data sets, each said sysplex comprising one or more computer systems each configured to run an operating system (OS) that includes access logic to open and close data sets on said DASD;
   wherein said VVRs are configured to include additional fields for a sysplex name, a system name and a sysplex usage counter in a stack, wherein a sysplex to first open a first data set is designated as an original sysplex at the top of the stack until closed, said usage counter indicating the number of systems in the sysplex for which the first data set is open;

wherein the OS access logic of a requesting system within the original sysplex is configured to grant an additional open request to the first data set, increment the usage counter and add information for the requesting system to the stack, to grant a close request to decrement the usage counter and remove the information for the requesting system in the original sysplex, and to remove the original sysplex from the stack when the usage counter reaches zero thereby allowing open requests from other sysplexes to open the first data set; and wherein the OS access logic for a requesting system outside the original sysplex is configured for a serial mode to fail an additional open request for the first data set when the usage counter of the original sysplex is non-zero and to record an error message to a first diagnostics log for the requesting system.

2. The system of claim 1, wherein said first diagnostics log is a foreground diagnostics log.

3. The system of claim 2, wherein said VVR further includes a job name field, wherein said foreground diagnostics log comprises a job log or a sys log for the requesting system.

4. The system of claim 1, wherein said VVR further includes a mode field that indicates whether the first data set is in the serial mode or a multi-access mode and a multi-access field that indicates whether multiple sysplexes have opened the data set, wherein in said multi-access mode the OS access logic of a requesting system in an additional sysplex outside the original sysplex is configured to grant an additional open request for the first data set, increment the usage counter for the additional sysplex, add information for the requesting system to the stack below the original sysplex, set the multi-access field for the first data set and record a message about the additional open request to a second diagnostics log for the requesting system, wherein upon closing a system in the original sysplex that system's OS logic is configured to determine if the multi-access field is set and if so to record a message about the additional open request to a third diagnostics log for the closing system in the original sysplex.

5. The system of claim 4, wherein said second and third diagnostics logs may be a foreground diagnostics log or a background diagnostics log.

6. The system of claim 5, wherein the foreground diagnostics log comprises a job log and a system log and the background diagnostics log comprises a logrec or an SMF log.

7. The system of claim 4, wherein upon closing of a system in the additional sysplex that system's OS logic is configured to decrement the usage counter for open systems in the additional sysplex and to set the usage counter to zero for the closing system while retaining the open information for both systems in the stack.

8. The system of claim 7, wherein upon closing of the last system in the original sysplex that system's OS logic is configured to remove the original sysplex from the stack and to remove systems in the additional sysplex whose usage counter is zero from the stack.

9. The system of claim 8, wherein upon removing the original sysplex the next additional sysplex in the stack moves to the top of the stack and is designated the original sysplex, wherein the last system's OS logic is configured upon closing to reset the multi-access flag if there are no remaining additional sysplexes.

10. The system of claim 4, wherein at least one data set is in the serial mode and at least one data set is in the multi-access mode.

11. The system of claim 4, wherein the recorded messages include only information of the additional open requests.

12. A system for monitoring data integrity among a plurality of computer sysplexes that share data sets on a direct access storage device (DASD) without means to communicate between the sysplexes to serialize access to the shared data sets, each said sysplex comprising:

one or more computer systems each configured to run an operating system (OS) that includes access logic to open and close data sets on said DASD, and virtual volume records (VVRs) on DASD having fields that contain information related to a particular data set, additional fields in said VVR including a mode field that indicates whether the data set is in a serial or multi-access mode and fields that contain information related to systems that have opened the data set, wherein the sysplex of a first system to open a data set is designated as an original sysplex, and additional data integrity logic within the OS access logic in each system in the multiple sysplexes, said additional data integrity logic configured to take actions when executing a data set open or close including reading and updating information contained in the additional access fields and issuing messages to diagnostic logs for the system executing the open or close, wherein in said serial mode said data integrity logic is configured to allow only systems in the original sysplex to open the data set and to issue an error message to the diagnostic log for a system outside the original sysplex that tries to open the data set, wherein in said multi-access mode said data integrity logic is configured to allow systems from the original sysplex and an additional sysplex to open the data set and to issue a warning or informational message to the requesting system's diagnostic log at open for a requesting system in the additional sysplex and at close for a requesting system inside the original sysplex.

13. The system of claim 12, wherein the additional access fields further include a multi-access field that indicates whether multiple sysplexes have opened the data set, a sysplex name, a system name and a sysplex usage counter that indicates the number of systems in the sysplex that have the data set open in a stack.

14. The system of claim 13, wherein in said serial mode, said additional data integrity logic is configured to grant an additional open request to the data set if the requesting system is within the original sysplex, increment the usage counter and add information for the requesting system for the sysplex name and system name fields to the stack, said additional data integrity logic is configured to grant a close request to decrement the usage counter and remove the information for the requesting system in the original sysplex, and to remove the original sysplex from the stack when the usage counter reaches zero thereby allowing open requests from systems in other sysplexes to open the data set; and said additional integrity logic is configured to fail an additional open request for the data set if the requesting system is outside the original sysplex and to issue an error message to the diagnostics log for the requesting system.

15. The system of claim 13, wherein in said multi-access mode, said additional data integrity logic is configured to open the data set for the requesting system OS, add information for the requesting system in the sysplex name and system name fields and increment the usage counter for the sysplex, to set the multi-access field if the data set has been opened by systems from more than one sysplex, and to issue the warning or information message to the diagnostics log if the requesting system is outside the original sysplex;

said additional data integrity logic is configured to close the data set for the requesting system OS if outside the original sysplex, decrement the usage counter for any open systems and to set the usage counter to zero for the requesting system;

said additional data integrity logic is configured to close the data set for the requesting system OS if within the original sysplex, remove the entry for the requesting system, decrement the usage counter for the original sysplex and, if the multi-access field is set, to issue the warning or information message to the diagnostics log for requesting system.

16. The system of claim 12, wherein at least one data set is serial mode and at least one data set is multi-access mode.

17. A method for monitoring data integrity among a plurality of computer sysplexes that share data sets on a direct access storage device (DASD) without means to communicate between the sysplexes to serialize access to the shared data sets, each said sysplex comprising one or more computer systems each configured to run an operating system (OS) that includes access logic to open and close data sets on said DASD, and virtual volume records (VVRs) on DASD having fields that contain information related to a particular data set, the method comprising:

configuring the VVRs to include additional fields including a mode field that indicates whether the data set is in a serial or multi-access mode and fields that contain information related to systems that have opened the data set, wherein the sysplex of a first system to open a data set is designated as an original sysplex, and configuring the OS access logic in each system with additional data integrity logic configured to take actions when executing a data set open or close including reading and updating information contained in the additional access fields and issuing messages to diagnostic logs for the system executing the open or close, wherein in said serial mode said data integrity logic is configured to allow only systems in the original sysplex to open the data set and to issue an error message to the diagnostic log for a system outside the original sysplex that tries to open the data set, wherein in said multi-access mode said data integrity logic is configured to allow systems from the original sysplex and an additional sysplex to open the data set and to issue a warning or informational message to the requesting system's diagnostic log at open for a requesting system in the additional sysplex and at close for a requesting system inside the original sysplex.

18. The method of claim 17, wherein configuring the VVR includes adding a multi-access field that indicates whether multiple sysplexes have opened the data set, a sysplex name, a system name and a sysplex usage counter that indicates the number of systems in the sysplex that have the data set open in a stack.

19. The method of claim 18, wherein in said serial mode, said additional data integrity logic is configured to grant an additional open request to the data set if the requesting system is within the original sysplex, increment the usage counter and add information for the requesting system for the sysplex name and system name fields to the stack, said additional data integrity logic is configured to grant a close request to decrement the usage counter and remove the information for the requesting system in the original sysplex, and to remove the original sysplex from the stack when the usage counter reaches zero thereby allowing open requests from systems in other sysplexes to open the data set; and said additional integrity logic is configured to fail an additional open request for the data set if the requesting system is outside the original sysplex and to issue an error message to the diagnostics log for the requesting system.

20. The method of claim 18, wherein in said multi-access mode, said additional data integrity logic is configured to open the data set for the requesting system OS, add information for the requesting system in the sysplex name and system name fields and increment the usage counter for the sysplex, to set the multi-access field if the data set has been opened by systems from more than one sysplex, and to issue the warning or information message to the diagnostics log if the requesting system is outside the original sysplex;

said additional data integrity logic is configured to close the data set for the requesting system OS if outside the original sysplex, decrement the usage counter for any open systems and to set the usage counter to zero for the requesting system;

said additional data integrity logic is configured to close the data set for the requesting system OS if within the original sysplex, remove the entry for the requesting system, decrement the usage counter for the original sysplex and, if the multi-access field is set, to issue the warning or information message to the diagnostics log for requesting system.

* * * * *